(12) United States Patent
Schwartz et al.

(10) Patent No.: US 9,367,181 B2
(45) Date of Patent: Jun. 14, 2016

(54) SYSTEM AND METHOD FOR DETERMINING USER INPUT AND INTERFERENCE ON AN INPUT DEVICE

(75) Inventors: Adam Schwartz, Redwood City, CA (US); Joseph Kurth Reynolds, Mountain View, CA (US); John Weinerth, San Jose, CA (US); Joel C. Jordan, Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 687 days.

(21) Appl. No.: 13/043,250

(22) Filed: Mar. 8, 2011

(65) Prior Publication Data

US 2012/0229415 A1 Sep. 13, 2012

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ............................... G06F 3/044; G06F 3/0418
USPC .................... 345/173–174; 178/18.03–18.07; 702/191
See application file for complete search history.

(56) References Cited

U.S. PATENT DOCUMENTS

| 5,543,590 | A | * | 8/1996 | Gillespie et al. | ........... | 178/18.06 |
| 7,643,011 | B2 | | 1/2010 | O'Connor et al. | | |
| 8,493,331 | B2 | | 7/2013 | Krah et al. | | |
| 2007/0262966 | A1 | * | 11/2007 | Nishimura et al. | ........... | 345/173 |
| 2008/0162997 | A1 | * | 7/2008 | Vu et al. | .......................... | 714/27 |
| 2008/0309625 | A1 | | 12/2008 | Krah et al. | | |
| 2008/0309628 | A1 | | 12/2008 | Krah et al. | | |
| 2010/0060589 | A1 | | 3/2010 | Wilson | | |

(Continued)

FOREIGN PATENT DOCUMENTS

JP 1996-327677 * 12/1996
JP 8327677 A 12/1996

(Continued)

OTHER PUBLICATIONS

International Searching Authority, International Search Report and Written Opinion for International Application No. PCT/US2012/026967 dated Nov. 29, 2012.

(Continued)

*Primary Examiner* — Jonathan Horner
(74) *Attorney, Agent, or Firm* — Osha · Liang LLP

(57) ABSTRACT

The embodiments described herein provide devices and methods that facilitate improved performance. In one embodiment, an input device comprises a processing system, a transmitter sensor electrode, and a receiver sensor electrode, where the transmitter sensor electrode and the receiver sensor electrode are capacitively coupled. The processing system is configured to receive a resulting signal from the receiver sensor electrode, where the resulting signal includes responses that correspond to the transmitter signal. The processing system is further configured to separately accumulate, for each cycle of the transmitter waveform, a first portion and a second portion of the resulting signal to respectively produce a first accumulation and a second accumulation, wherein the first accumulation is used for determining user input to the input device and the second accumulation is used for determining interference, and wherein the first portion and the second portion are non-coterminous.

20 Claims, 10 Drawing Sheets

(56) References Cited

U.S. PATENT DOCUMENTS

2010/0071459 A1* 3/2010 Kamm et al. .................. 73/304
2010/0079401 A1* 4/2010 Staton ........................... 345/174
2011/0115729 A1* 5/2011 Kremin et al. ................ 345/173

FOREIGN PATENT DOCUMENTS

| KR | 20090097983 A | 9/2009 |
| WO | 9802964 | 1/1998 |
| WO | 9802964 A1 | 1/1998 |

OTHER PUBLICATIONS

The International Bureau of WIPO, International Preliminary Report on Patentability for International Application No. PCT/US2012/026967, mailed Sep. 19, 2013.

\* cited by examiner

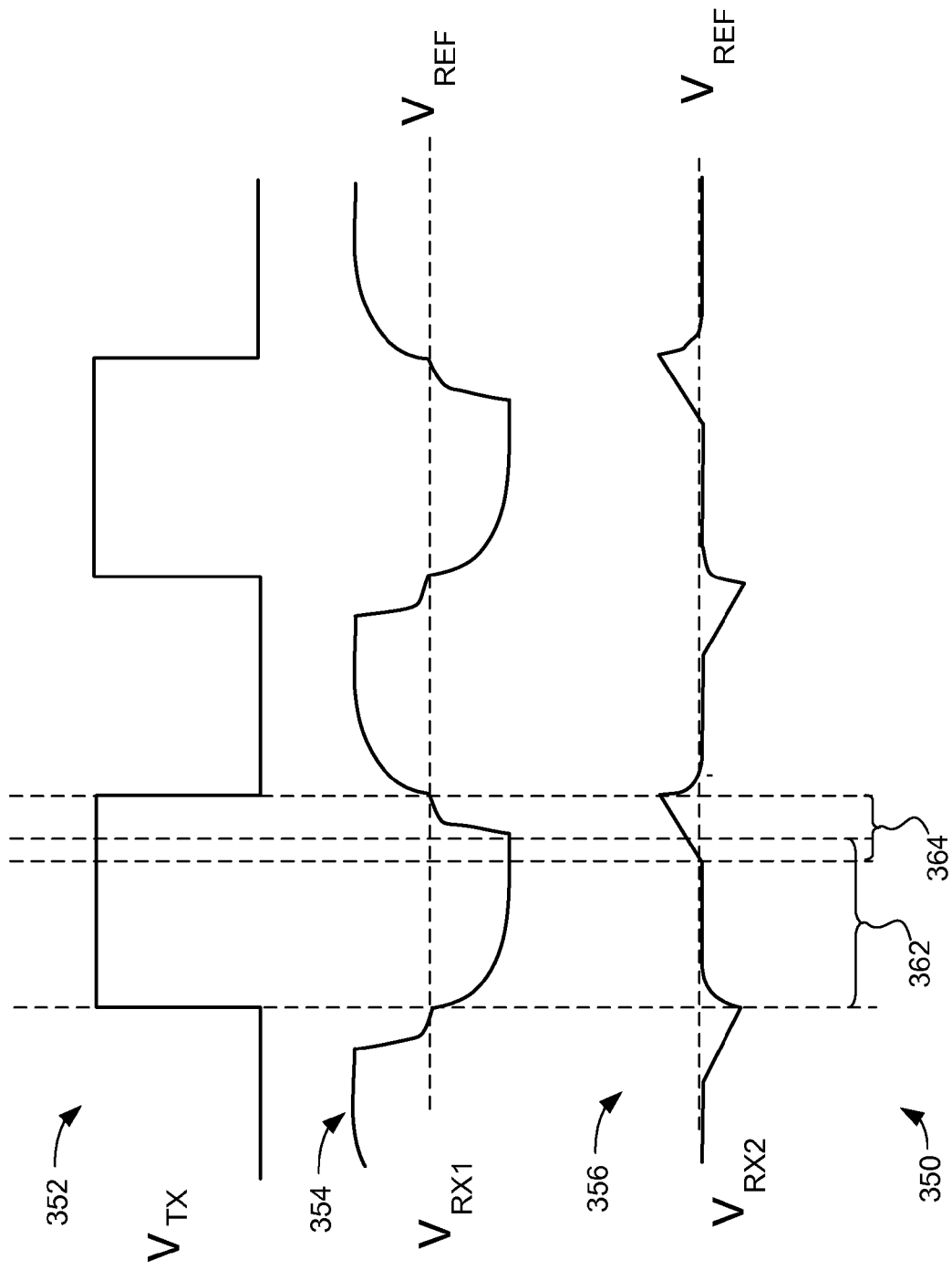

SYSTEM AND METHOD FOR DETERMINING USER INPUT AND INTERFERENCE ON AN INPUT DEVICE

FIELD OF THE INVENTION

This invention generally relates to electronic devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

While proximity sensor devices have found many applications, engineers continue to seek design alternatives that reduce costs and/or improve sensor performance. In particular, significant attention has been paid in recent years to identifying and reducing the effects of interference on proximity sensors. For example, identifying the effects of noise and other interference generated by display screens, power sources, radio frequency interference and/or other sources outside of the proximity sensor.

However, there remains a continuing need for improvements in the techniques used to identify the effects of interference in proximity sensor devices. Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved sensor devices. Specifically, the devices and methods provide the ability to determine both user input and interference for input devices. The reliable determination of interference in input device facilitates ameliorative action, and thus facilitates improved input device performance In one embodiment, an input device comprises a processing system, a transmitter sensor electrode, and a receiver sensor electrode, where the transmitter sensor electrode and the receiver sensor electrode are capacitively coupled. The processing system is configured to drive a transmitter signal onto the transmitter sensor electrode, where the transmitter signal comprises a transmitter waveform with repeating cycles, wherein each cycle of the transmitter waveform includes a first transition. The processing system is further configured to receive a resulting signal from the receiver sensor electrode, where the resulting signal includes responses that correspond to the transmitter signal. The processing system is further configured to separately accumulate, for each cycle of the transmitter waveform, a first portion and a second portion of the resulting signal to respectively produce a first accumulation and a second accumulation, wherein the first accumulation is used for determining user input to the input device and the second accumulation is used for determining interference, and wherein the first portion and the second portion are non-coterminous. Thus, the input device is configured to determine both user input and interference in the input device.

In another embodiment, a processing system for a capacitive input device is provided that comprises transmitter circuitry, receiver circuitry, and accumulator circuitry. The transmitter circuitry is configured to drive a transmitter signal, where the transmitter signal comprises a transmitter waveform with repeating cycles, and where each cycle of the transmitter waveform includes a first transition. The receiver circuitry is configured to receive a resulting signal that includes responses corresponding to the transmitter signal, and the accumulator circuitry is configured to, for each cycle of the transmitter waveform, separately accumulate a first portion and a second portion of the resulting signal to respectively produce a first accumulation and a second accumulation, wherein the first accumulation is used for determining user input and the second accumulation is used for determining interference, and wherein the first portion and the second portion are non-coterminous.

Thus, the devices and methods provide the ability to determine both user input and interference for input devices using are non-coterminous portions of a resulting signal. This provides a reliable determination of interference in the input device, and may facilitate improved input device performance.

BRIEF DESCRIPTION OF DRAWINGS

The preferred exemplary embodiment of the present invention will hereinafter be described in conjunction with the appended drawings, where like designations denote like elements, and:

FIGS. 3A and 3B are graphical representations of transmitter signals and accumulated portions of resulting signals in accordance with embodiments of the invention;

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved noise determination.

Figure 1:
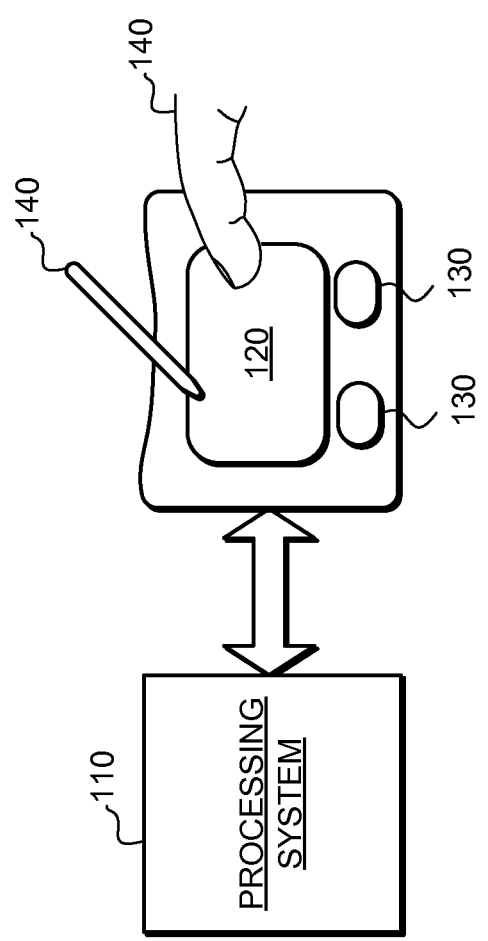
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to capacitively sense input provided by one or more input objects 140 in a sensing region 120. Example input objects include fingers and styli, as shown in FIG. 1.

Sensing region 120 encompasses any space above, around, in and/or near the input device 100 in which the input device 100 is able to capacitively detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

Some implementations are configured to provide images that span one, two, three, or higher dimensional spaces. Some implementations are configured to provide projections of input along particular axes or planes.

In a suitable capacitive implementations of the input device 100, voltage or current is applied to create an electric field. Nearby input objects cause changes in the electric field, and produce detectable changes in capacitive coupling that may be detected as changes in voltage, current, or the like.

Some such capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 also comprises electronically-readable instructions, such as firmware code, software code, and/or the like. For example, a processing system 110 for a mutual capacitance sensor device may comprise transmitter circuitry configured to transmit signals with transmitter sensor electrodes, receiver circuitry configured to receive signals with receiver sensor electrodes, and accumulator circuitry to accumulate portions of the received signals.

In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

In general, the various embodiments provide devices and methods that facilitate the ability to determine both user input and interference for input devices. The reliable determination of interference in input device facilitates ameliorative action to avoid or compensate for such interference, and thus facilitates improved input device performance In one embodiment, the processing system 110 is coupled to a transmitter sensor electrode, and a receiver sensor electrode, where the transmitter sensor electrode and the receiver sensor electrode are capacitively coupled. The processing system 110 is configured to drive a transmitter signal onto the transmitter sensor electrode, where the transmitter signal comprises a transmitter waveform with repeating cycles, wherein each cycle of the transmitter waveform includes a first transition. The processing system 110 is further configured to receive a resulting signal from the receiver sensor electrode, where the resulting signal includes effects that correspond to the transmitter signal. The processing system 110 is further configured to separately accumulate, for each cycle of the transmitter waveform, a first portion and a second portion of the resulting signal to respectively produce a first accumulation and a second accumulation, wherein the first accumulation is used for determining user input to the input device and the second accumulation is used for determining interference, and wherein the first portion and the second portion are non-coterminous. Thus, the input device 100 is configured to determine both user input and interference in the input device.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2B:
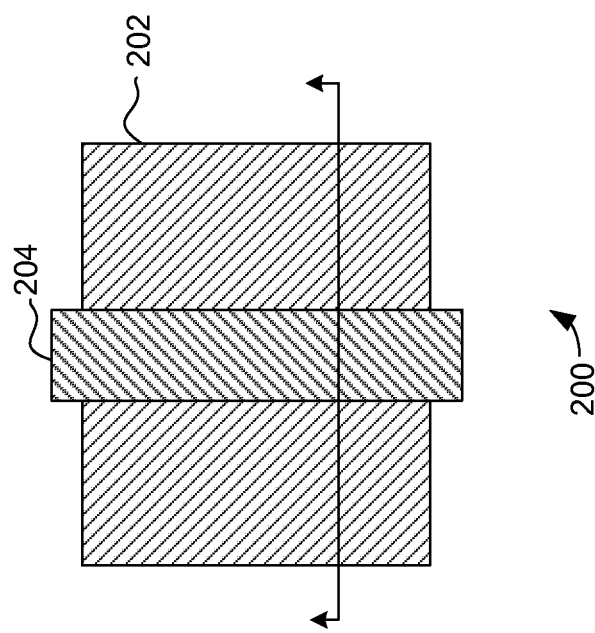
FIGS. 2A and 2B are top and side views of an input device in accordance with an embodiment of the invention.
Figure 2A:
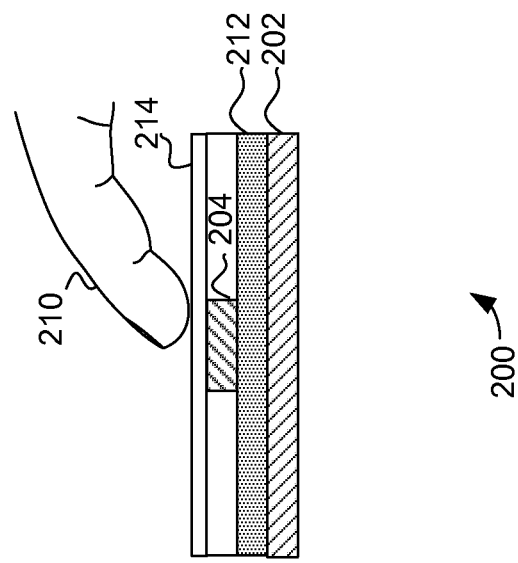

In general, the various embodiments provide devices and methods that facilitate the ability to determine both user input and interference for input devices. The reliable determination of interference in input device facilitates ameliorative action to avoid or compensate for such interference, and thus facilitates improved input device performance Turning now to FIG. 2, a side view of an exemplary input device 200 is illustrated schematically in FIG. 2a, and a partial top view of device 200 is partially illustrated in FIG. 2b. The input device 200 includes a set of sensor electrodes comprising a transmitter sensor electrode 202 and a receiver sensor electrode 204. Between transmitter sensor electrode 202 and receiver sensor electrode 204 is an insulating layer 212. The insulating layer 212 ohmically isolates the transmitter sensor electrode 202 from the receiver sensor electrode 204 and in part defines the transcapacitance between those electrodes. Finally, a protective layer 214 covers the deflectable electrode layer. It should be noted that while all these elements are illustrated in FIG. 2a, for clarity FIG. 2b illustrates only the transmitter sensor electrode 202 and the receiver sensor electrode 204.

The transmitter sensor electrode 202 and the receiver sensor electrode 204 are capacitively coupled together for sensing inputs objects (e.g., finger 210) in the sensing region. Specifically, the transmitter sensor electrode 202 and the receiver sensor electrode 204 are capacitively coupled through the insulating layer 212 to form a transcapacitance. When input objects such as finger 210 are brought proximate to the input device 200 (i.e., within the sensing region of the input device 200) they cause a change in the measured transcapacitance between the transmitter sensor electrode and the receiver sensor electrode. This change in transcapacitance may be measured and used to detect the presence of the objects causing the change, and determine positional information related to these objects.

A variety of different materials and techniques can be used to form the transmitter sensor electrode 202 and the receiver sensor electrode 204. For example, the transmitter sensor electrode 202 and the receiver sensor electrode 204 can be patterned using a conductive material, such as ITO (indium tin oxide), silver or carbon conductive ink, and copper. Further, any appropriate patterning process may be used, including sputter deposition, printing, and etching. The protective layer 214 can be formed from any appropriate material. For example, the protective layer 214 can be implemented using a sheet of textured polyester material, such as that sold under the trade name MYLAR.

The embodiment illustrated in FIG. 2 is an input device 200 that includes only one transmitter sensor electrode 202 and one receiver sensor electrode 204. Implemented by itself, such a device can be used to determine zero-dimensional positional information and force/pressure and type information for one object at a time. Other implementations may include multiple such electrodes arranged together and having the ability to determine such information for multiple input objects simultaneously. Additionally, such devices can typically determine a wider range of positional information, such as the one and two dimensional position information described above. As one specific example, the input device may include a set of transmitter sensor electrodes aligned in a first direction, and a set of receiver sensor electrodes aligned in a second direction, with the transmitter sensor electrodes electrically insulated from the receiver sensor electrodes.

As described above, in a typical implementation one or more transmitter sensor electrodes 202 and receiver sensor electrodes 204 are coupled to a processing system, such as processing system 110 of FIG. 1. In these embodiments the processing system 110 may include transmitter circuitry configured to transmit signals with transmitter sensor electrodes 202, receiver circuitry configured to receive signals with receiver sensor electrodes 204, and accumulator circuitry to accumulate portions of the received signals. As will be described in greater detail below, in some such embodiments the transmitter circuitry is configured to drive a transmitter signal, where the transmitter signal comprises a transmitter waveform with repeating cycles, and where each cycle of the transmitter waveform includes a first transition. The receiver circuitry may likewise be configured to receive a resulting signal that includes effects corresponding to the transmitter signal, and the accumulator circuitry may be configured to, for each cycle of the transmitter waveform, separately accumulate a first portion and a second portion of the resulting signal to respectively produce a first accumulation and a second accumulation, wherein the first accumulation is used for determining user input and the second accumulation is used for determining interference, and wherein the first portion and the second portion are non-coterminous.

In separately accumulating a first portion and a second portion of the resulting signal, where the first and second portions are non-coterminous, a variety of different techniques may be used. The first and second portions are non-coterminous in the sense that they accumulate a different part of the resulting signal. Stated another way, the start and stop times of the first and/or second portions are not the same. In general, it is desirable in most applications for the second portion to begin after the effects of previous transitions in the transmit signal have substantially settled and the effects of interference on the received signal predominate. This may be accomplished by configuring the system to start the second portion a predetermined time period after the beginning of the first portion. Alternatively, the system may be configured to start the second portion a predetermined time period after a transition. In some embodiments, the system may be configured to start the second portion at a time when the resulting signal being accumulated during the first portion meets certain criteria. For example, when the resulting signal has settled a specified amount after the previous transition. However, in some embodiments the first portion may partially overlap in time with the second portion.

In such a configuration, the second portion may overlap, at least in part, with a reset period for an accumulator of the first portion of the resulting signal. For example, in one embodiment the first portion of the resulting signal may be accumulated with a first capacitor, while the second portion of the resulting signal may be accumulated with a second capacitor. In such an embodiment, the first capacitor may be reset at regular intervals, such as once for every transition of the transmitter waveform, allowing the accumulated signal to be discharged. In this embodiment, the second portion of the resulting signal may comprise a portion of the resulting signal that overlaps in time with the reset period. Thus, the second portion of the resulting signal is accumulated on the second capacitor for at least a portion of the time that the first capacitor is being reset.

In a further variation on these embodiments, the accumulator circuitry may also be configured to accumulate a third portion of the resulting signal to produce a third accumulation, wherein the third portion includes effects of the second transition on the resulting signal, and wherein the third accumulation is also used for detecting the user input. And in a still further variation, the accumulator circuitry may also be configured to accumulate a fourth portion of the resulting signal to produce a fourth accumulation, wherein the fourth portion starts after a beginning of the third portion, and wherein the fourth accumulation is also used for detecting interference. These embodiments are applicable in a situation where the transmitter waveform has more than one transition per sensing cycle. These embodiments are also applicable in a situation where the first and second portions of the resulting signal corresponding to the first half of the transmitter waveform cycle and the third and forth portions of the resulting signal correspond to the second half of the transmitter waveform cycle.

When a transmitter signal is applied to a transmitter sensor electrode, charge is transferred to the receiver sensor electrode because of the capacitive coupling between the transmitting and receiving electrodes. This charge transfer causes a resulting signal on the receiver sensor electrode. This resulting signal may be accumulated, and the accumulation of the resulting signal used to determine a measure of the capacitance between the transmitter sensor electrode and the receiver sensor electrode. Furthermore, as this capacitance is affected by the presence of conductive objects, the resulting signal may be used to provide a measure of changes in capacitance that are caused by proximate objects and thus may be used to detect the presence of conductive objects. Again, it should be noted that during operation, the intended effects in the resulting signal correspond to the transmitter signal. However, some effects in the resulting signal will typically correspond to other causes, such as the presence of objects, noise and other types of interference.

Figure 3A:
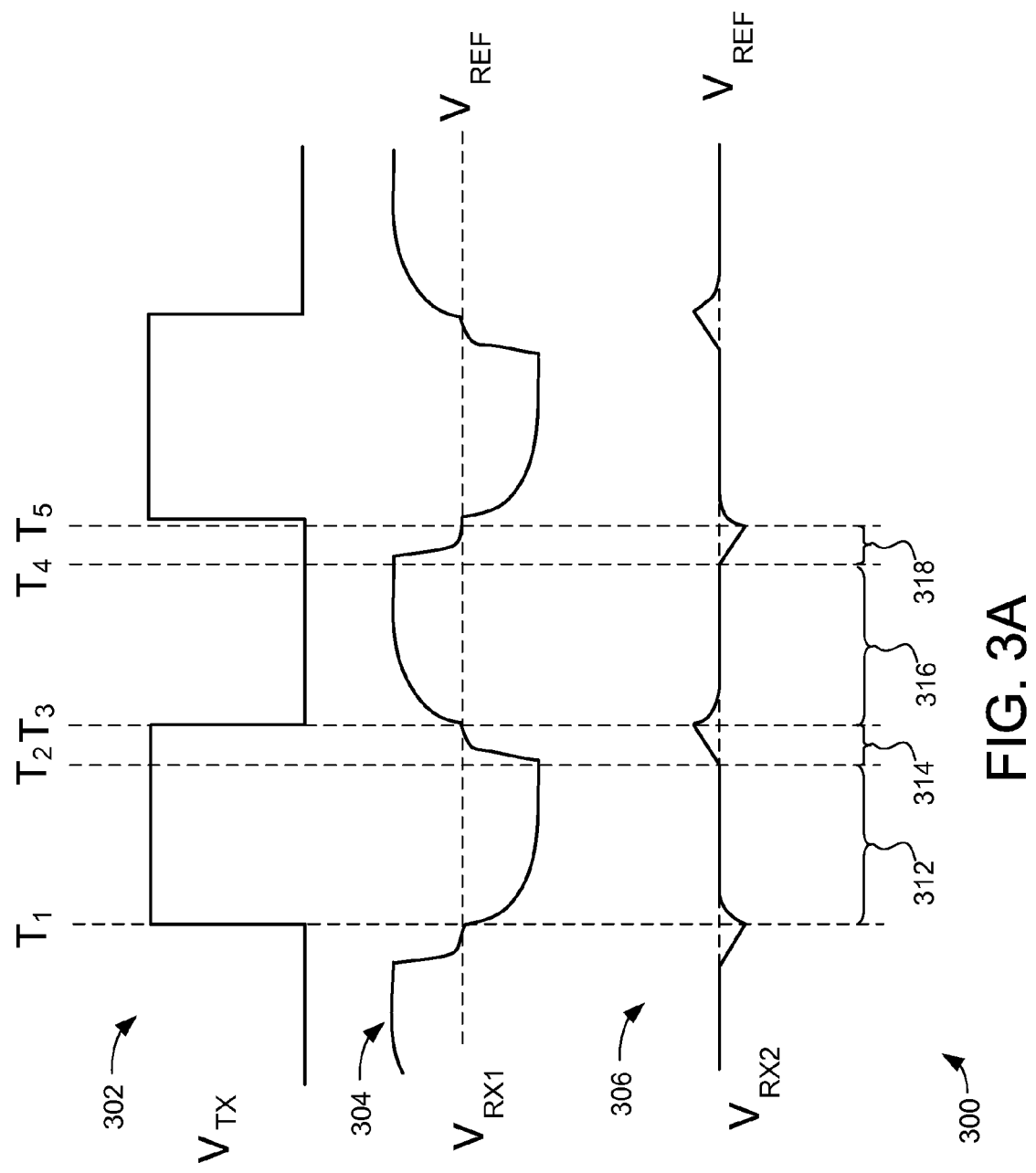

A variety of different types of signals may be used for the transmitter signal. In some embodiments, a transmitter signal comprises a waveform with repeating cycles, where each cycle includes at least a first transition. For example, one typical example is a square wave. Of course, other waveforms could be used, including various types of sine waves. Turning now to FIG. 3A, a graph 300 illustrates a transmitter signal 302, a waveform 304 illustrating an accumulation of a first portion 312 of a resulting signal, and a waveform 306 illustrating an accumulation of a second portion 314 of the resulting signal. In this illustrated embodiment, the transmitter signal 302 comprises a square wave. Such a square wave may be described as comprising repeating cycles, which each cycle includes a first transition (e.g., from a high to low voltage or from a low to high voltage) and a second transition (e.g., from a low to high voltage or from a high to low voltage). In the illustrated example, the transmitter signal switches between two voltages, with the signal transitioning twice per period. For purposes of this discussion, assume that a first transition occurs at time $T_1$, and a second transition occurs at time $T_3$ although, in most cases the designation of a "first transition" and a "second transition" is arbitrary.

Waveform 304 illustrates an accumulation of a first portion 312 of an exemplary resulting signal for determining user input, and waveform 306 illustrates an accumulation of a second portion 314 of the resulting signal for determining interference. In this illustrated embodiment, the accumulation of the first portion 312 begins at or shortly after the first transition $T_1$, and ends at time $T_2$. Likewise, the accumulation of the second portion 314 begins at or shortly after the time $T_2$, and ends at or before time $T_3$. It should be noted in this case there is no overlap between the first and second portions, although that is just one example, and in some embodiments there may be overlap between the portions. It should also be noted that there is no requirement that the end of the first portion 312 coincide with the beginning of the second portion 314, or that the beginning and end of the portions coincide with the transitions of the transmitter signal. One such example will be discussed below with reference to FIG. 3B.

In the example of FIG. 3A, each cycle of the transmitter signal waveform includes two transitions, with a first transition occurring at time $T_1$ and a second transition occurring at time $T_3$. In some embodiments it will be desirable to accumulate the resulting signal in the second half of each cycle, although this is not required for all applications. In FIG. 3A, waveform 304 illustrates an accumulation of a third portion 316 of an exemplary resulting signal for determining user input, and waveform 306 illustrates an accumulation of a fourth portion 318 of the resulting signal for determining interference. In this illustrated embodiment, the accumulation of the third portion 316 begins at or shortly after the second transition $T_3$, and ends at time $T_4$. Likewise, the accumulation of the fourth portion 318 begins at or shortly after the time $T_4$, and ends at or before time $T_5$. Again, it should be noted in this case there is no overlap between the third and fourth portions, although that is just one example, and in some embodiments there may be overlap between the portions. It should also be noted that there is no requirement that the end of the third portion coincide with the beginning of the fourth portion, or that the beginning and end of the portions coincide with the transitions of the transmitter signal.

Finally, it should be noted that the first portion of the resulting signal may be accumulated from the first half of the transmitter cycle, and the second portion of the resulting signal may be accumulated from the second half of the transmitter cycle (e.g., after time $T_3$). In this case, the second portion may actually occur at the time illustrated as the fourth portion 318 in FIG. 3A.

It should also be noted that in the illustrated example, the second portion 314 and fourth portion 318 of the resulting signal each overlap at least in part with reset periods of the accumulator used to accumulate the first portion 312. In one embodiment, this reset period is used to reset a capacitor used to accumulate charge, for example, by shorting the capacitor to remove the accumulated charge, or by otherwise setting the capacitors to a reference voltage (e.g., $V_{REF}$). Such an embodiment may provide the advantage of improving the performance of the device by reducing the time allocated to accumulating the resulting signal for interference determination. Specifically, because the time used to accumulate for interference determination is between accumulations for user input determination and during the required reset periods, the amount of additional time each cycle that needs to be dedicated to interference determination is reduced and may even be eliminated.

Turning now to FIG. 3B, a second graph 350 illustrates a transmitter signal 352, a waveform 354 illustrating an accumulation of a first portion 362 of a resulting signal, and a waveform 356 illustrating an accumulation of a second portion 364 of the resulting signal. Like the example of the FIG. 3A, the first portion 362 and the second portion 364 are non-coterminous. However, in contrast with the example of FIG. 3A, in this example there is temporal overlap between the first portion 362 and the second portion 364. Specifically, the first portion 362 begins before the end of the first portion 364.

As was noted above, the second portions of the resulting signal is accumulated to determine interference in the input device. The determined interference can comprise any type of interference that may impact the performance of input device. For example, the interference may comprise random fluctuations in electrical signals, typically referred to as noise. The interference may also comprise other electrically and thermally created distortions in signals. The input device interference may come from a variety of sources. For example, the interference may comprise background interference that affects the input device even when no input object is present. Examples of background interference sources include other nearby electrical elements, such as display screens, conductors, other electrodes, etc. As another example, the interference may comprise input object coupled interference. This type of interference is coupled to the input device when an input object such as a finger is in or near the sensing region. For example, electrical noise from other sources such as fluorescent lights may be coupled to the input device when a finger is present in the sensing region. All of these types of interference may negatively impact the performance of the input device, and may be measured during the second portion of the resulting signal.

The devices and methods described herein may use a variety of different techniques to determine interference in the input device using the accumulated second portion of the resulting signals. In general, the devices and methods will sample the accumulated second portions and analyze the second portions to determine the interference. This generally involves determining the amount of "energy" in the accumulated second portions using any suitable technique. For example, the devices may determine a peak, mean or and/or minimum amount interference using samples of the accumulated second portions. Additionally, in embodiments where accumulated second portions and accumulated fourth portions are used to determine interference, these maybe used together using various techniques. In some embodiments the energy from the accumulated second portion is combined with the energy from the accumulated fourth portion to determine the energy of the combined measurements. In some embodiments, the measurements from the fourth portions are subtracted from the measurements of the second portion to combine the measurements. In other embodiments, an offset is removed from the accumulated second portion and the accumulated fourth portion before resolving the portions together.

In some embodiments, the input device accumulates the second portions (and in some embodiments the fourth portions) of the resulting signals, samples and analyzes the accumulated signals to acquire a measurement of the interference. Sampling the accumulated signals may be done by any circuit or element capable of sampling the accumulated signals. For example, in various embodiments, this sampling may be performed by a demodulator, including any suitable digital or analog demodulator, sampled or continuous. It should be noted that while a demodulator may be used, such a device would not be performing demodulation in the technical sense. Specifically, because the interference was not originally modulated, it is not actually demodulated by the demodulator. Instead, the demodulator really functions as a type of sampler and/or combiner of the accumulated signals in these embodiments.

Further, in various embodiments, the accumulated signals may be filtered, either as part of the sampling or as a separate step. For example, a filter may be implemented with any suitable low-pass or band-pass filter, including any sort of digital or analog filter, sampled or continuous. A filter could alternatively be implemented and/or supplemented by a digital filter (e.g. an averaging filter). In some embodiments, the output of the sampling is then filtered.

The sampled accumulated signals can be individually and/or collectively processed in any manner to determine the amount of interference. For example, the sampled signals may be combined with other samples by adding, subtracting, squaring, sum of the squares, squaring of differences, etc. Furthermore, these peak or mean values of such combined measurements may be obtained and compared to one or more threshold values.

As other examples, the sampled signals can be analyzed over any suitable period of time to determine an interference measurement. For example, the maximum absolute value of the interference outputs over some time period may be recorded. Alternatively, the average absolute values may be computed. Alternatively, the mean square or root mean square derivative may be computed. Alternatively, the mean square or root mean square derivative may be computed. Further, in other embodiments, other statistical properties may be computed and analyzed to determine an interference measurement.

With the interference measurement determined, a variety of different responses may be taken. For example, capacitive measurements for noisy signals may be ignored when the interference is above a threshold. Actions may be taken to avoid the effects of detected interference, such as changing the driving frequency, changing filter parameters, receiver gain, or other parameters that may reduce the effects of noise.

Figure 4:
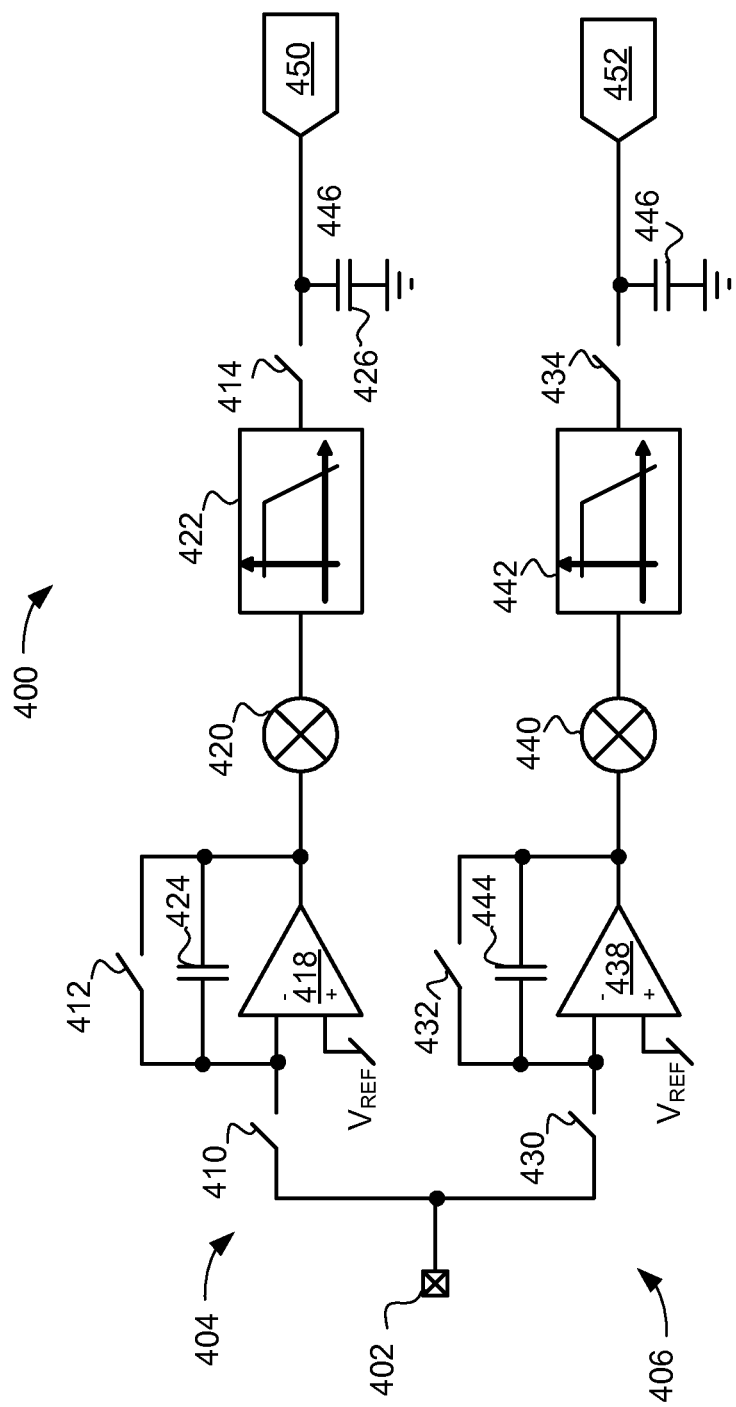
FIG. 4 is a schematic view of accumulator circuitry in accordance with an embodiment of the invention.

As described above, in various embodiments the processing system is configured to separately accumulate a first portion and a second portion of the resulting signal for each cycle to respectively produce a first accumulation and a second accumulation. The first accumulation is used to determine user input, and the second accumulation is used for determining interference. Turning now to FIG. 4, an embodiment of accumulation circuitry 400 is illustrated. The accumulation circuitry 400 includes an input 402 that is coupled to a first channel 404 and a second channel 406. The first channel 404 includes switches 410, 412 and 414 for controlling operation, amplifier 418, demodulator 420, filter 422, capacitors 424 and 426, and output 450. The second channel 406 likewise includes switches 430, 432, and 434, amplifier 438, sampler 440, filter 442, capacitors 444 and 446, and output 452.

In general, the accumulation circuitry 400 is configured to receive a resulting signal from a receiver electrode using input 402, and accumulate first portions of the resulting signal using first channel 404 and second portions of the resulting signal using second channel 406. Specifically, the capacitor 424 is configured in the negative feedback path of amplifier 418 such that the resulting signal is produced as the charger accumulated on the capacitor 424. Likewise, the capacitor 444 is configured in the negative feedback path of amplifier 438 such that the resulting signal is produced as the charge accumulated on the capacitor 444. The accumulated first portions are demodulated by demodulator 420, filtered by filter 422, sampled, and the sampled output passed to output 450. Similarly, the accumulated second portions are sampled by sampler 440, filtered by filter 442, sampled again, and the sampled output passed to output 450. It should be noted that the sampler 440 may be implemented with any suitable device or technique for combining or incorporating interference information. In some embodiments the sampler 440 may be implemented with a demodulator, although it will not perform a demodulation in the technical sense as the interference was not previously modulated.

Switches 410 and 430 control the inputs to the first and second channels respectively. Switches 412 and 432 serve to selectively reset the capacitors 424 and 444 respectively. Switch 414 serves to sample the output of filter 422 and switch 434 serves to sample the output of the filter 442.

During operation, the amplifier 418 serves to accumulate charge onto capacitor 424 during the first portion of each cycle in the resulting waveform. The accumulated charge is then sampled by the demodulator 420 producing a demodulated input sample. The demodulated input sample is proportional to the capacitance between the transmitter and receiver electrodes, and thus may be filtered and used to determine information regarding the presence of a conductive object. The switch 412 then closes for a reset period to reset the capacitor 424 for the next cycle.

During at least a portion of the reset period, when switch 412 is closed, switch 430 is closed and switch 410 is opened, and the amplifier 438 serves to accumulate charge onto capacitor 444 during a second portion of each cycle in the resulting waveform. The accumulated charge is then sampled by the sampler 440 producing a sampled interference sample.

The sampled interference sample is proportional to the interference affecting the receiver electrodes. Specifically, because the accumulation for the second portion occurs after the effects of last transition in the transmitter signal have settled, deviations in the interference sample are due primarily to interference to the system. That is to say, in an environment free of noise and other interference, there would be little or no variation in the interference samples. Thus, the interference sample may be analyzed to determine the amount of noise and other interference that is affecting the sample.

As was described above, in some embodiments the accumulator circuitry may be adapted to further accumulate third and fourth portions for each resulting signal cycle. In the embodiment illustrated in FIG. 4, the accumulation circuitry 400 may be configured to accumulate such third and fourth portions, where these portions correspond to periods after a second transition in each transmitter cycle. In this embodiment the third portions are accumulated for determining user input, and the fourth portions are accumulated for determining interference.

This may be accomplished by the amplifier 418 accumulating charge onto capacitor 424 during the third portion of each cycle in the resulting waveform. The accumulated charge is then sampled by the demodulator 420 producing a demodulated input sample. It should be noted that demodulator 420 is able to combine samples from both a positive and negative transition in the transmitter signal. Thus, the values from the accumulated first portion and the accumulated third portion may be combined and used to determined information regarding the presence of a conductive object.

Likewise, the amplifier 438 may accumulate charge onto capacitor 444 during a fourth portion of each cycle in the resulting waveform. This accumulation of the fourth portion may also occur at least in part during a reset of the capacitor 424. The accumulated charge is then sampled by the sampler 440 producing an interference sample. And it should again be noted that the sampler 440 is able to combine samples from both a positive and negative transition in the transmitter signal. Thus, the values from the accumulated second portion and the accumulated fourth portion may be combined and used to determined interference in input device.

To facilitate this, the outputs 450 and 452 may be coupled to any suitable processing mechanism. For example, the outputs 450 and 452 may be coupled to analog-to-digital converters (ADC) to facilitate digital processing of the input and interference information. For example, the digital processing may be used determine a peak, mean or and/or minimum amount interference using samples of the second portions. An example of such a system will be discussed below with reference to FIG. 9.

Figure 5:
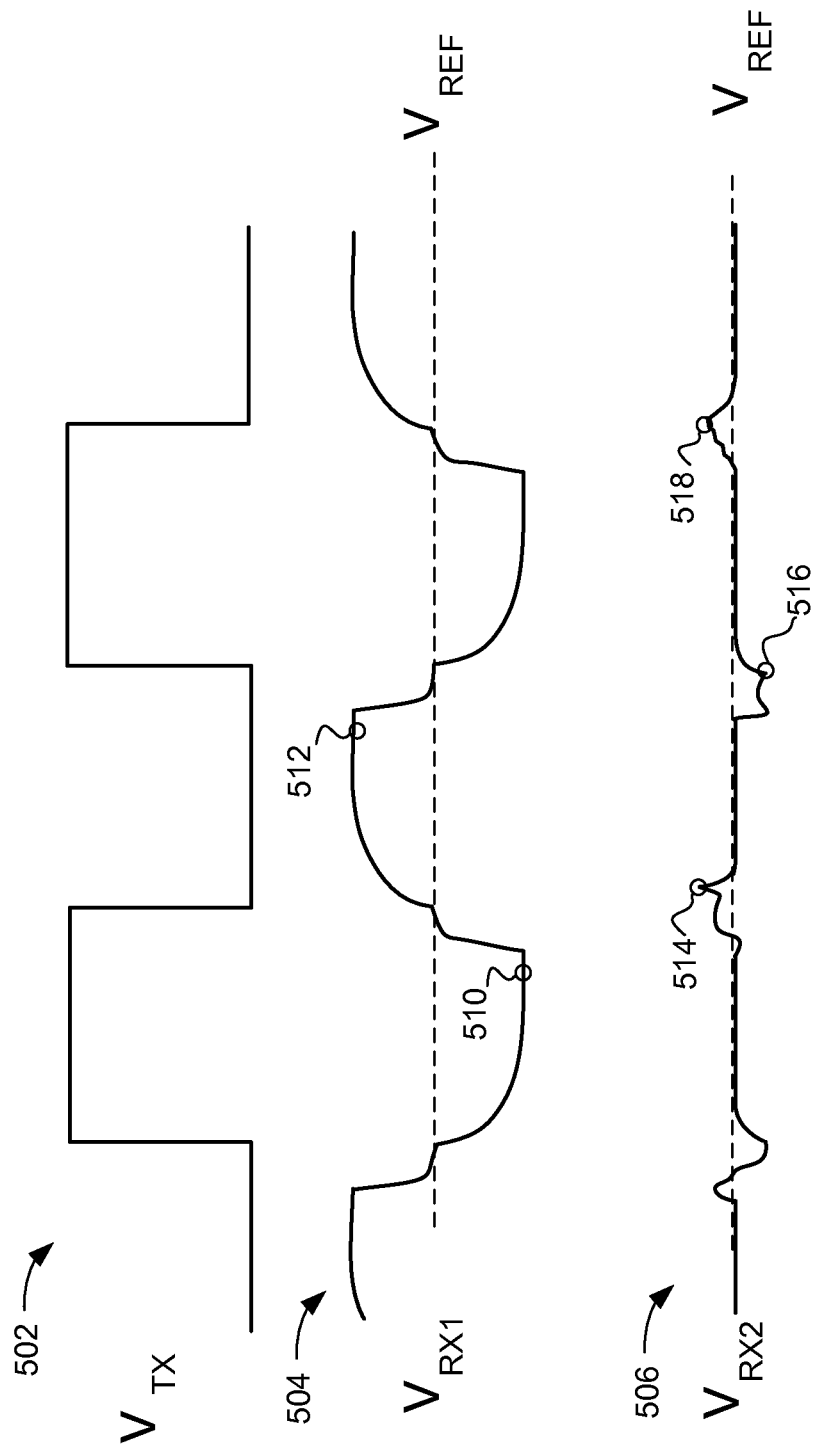
FIG. 5 are graphical representations of transmitter signals and accumulated portions of resulting signals in accordance with embodiments of the invention.

Turning now to FIG. 5, a graph 500 illustrates an exemplary transmitter signal 502, a waveform 504 illustrating an accumulation of first and fourth portions of a resulting signal on capacitor 424, and a waveform 506 illustrating an accumulation of a second and third portions on capacitor 424.

Waveform 504 illustrates an exemplary sample point 510 for the first portion, and sample point 512 for the second portion. These sample points indicate where demodulator 420 samples the output of amplifier 418. Again, it is noted that the demodulator 420 is able to combine samples from both a positive (e.g. the first portion) and negative transition (e.g. the third portion) in the transmitter signal. Thus, the values from sample point 510 and sample point 512 may be combined and used to determined information regarding the presence of a conductive object.

Likewise, waveform 506 illustrates an exemplary sample point 514 for the second portion, and sample point 516 for the fourth portion. These sample points indicate where sampler 440 samples the output of amplifier 438. The values from sample point 514 and sample point 516 may be combined and used to determine interference in the input device.

For example, where the measurement for sample point 514 is $x_1$, and the measurement for sample point 516 is $x_2$, a combined measurement of x may be determined as: $x=x_1-x_2$, $x=x_1+x_2$, $x=|x_1|+|x_2|$, or $x=x_1^2+x_2^2$, or $x=(x_1-x_2)^2$. Also, as mentioned above, such combined measurements may be filtered and can then be furthered combined to provide, for instance, a noise power estimate.

Also illustrated in FIG. 5 is that the effects of noise and other interference will have on the accumulated second portions. Specifically, because interference is not correlated with the transmitter drive signal, the accumulated second portions will commonly significantly deviate from a linear increase of signals. This is illustrated in the slopes of the accumulated second portion.

Returning to FIG. 4, the accumulation circuitry 400 may be implemented in a variety of different ways. For example, while accumulation circuitry 400 shows only one channel 404 for accumulating first portions of the resulting signal, in many applications with multiple receiver electrodes, multiple of such channels may be used. For example, in an embodiment with ten receiver electrodes each generating resulting signals, ten channels 404 may be implemented to determine user input.

Likewise, additional channels 406 for determining interference may be implemented. In some embodiments, a separate channel 406 for measuring interference may be implemented for each receiver electrode. In those embodiments the accumulation circuitry 400 would be duplicated for each receiver electrode.

Figure 6:
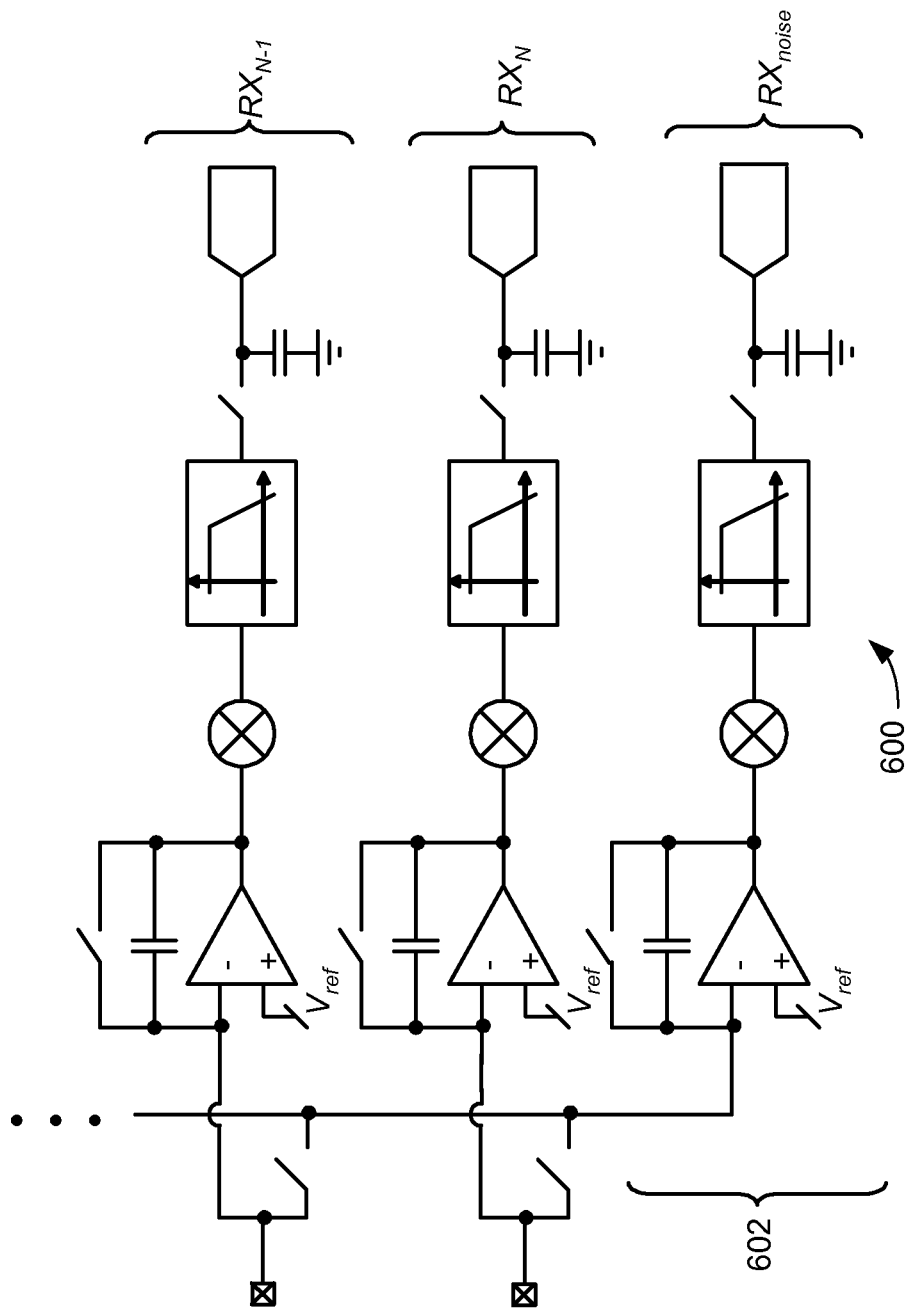
FIGS. 6-9 are schematic views of accumulator circuitries in accordance with embodiments of the invention.

However, in some embodiments a reduced number of channels may be provided for determining interference. In one such embodiment the interference measuring channels may be shared between multiple receiver electrodes. Turning now to FIG. 6, an embodiment of accumulation circuitry 600 is illustrated where one interference measuring channel 602 is coupled to measure interference in each of N different sensing electrodes. In such an embodiment the interference measuring channel may measure interference on multiple receiver electrodes sequentially or simultaneously. In some such embodiments, the interference measuring channel may be switched between receiver electrodes, effectively multiplexing the determination of interference in the receiver electrodes. In some such embodiments, the gain of the amplifier (for instance as determined by the feedback capacitance value) of the interference channel 602 may be different and/or selectively programmable in order to avoid saturation while providing adequate resolution based on the number of receiver electrodes coupled to the interference channel 602.

Furthermore, in some such embodiments the interference may only be determined for receiver electrodes that are actively detecting an input object. In such cases, the interference measuring channel 602 may be coupled to the electrodes that have the largest detected signal, or switched between electrodes that are detecting signal.

Figure 7:
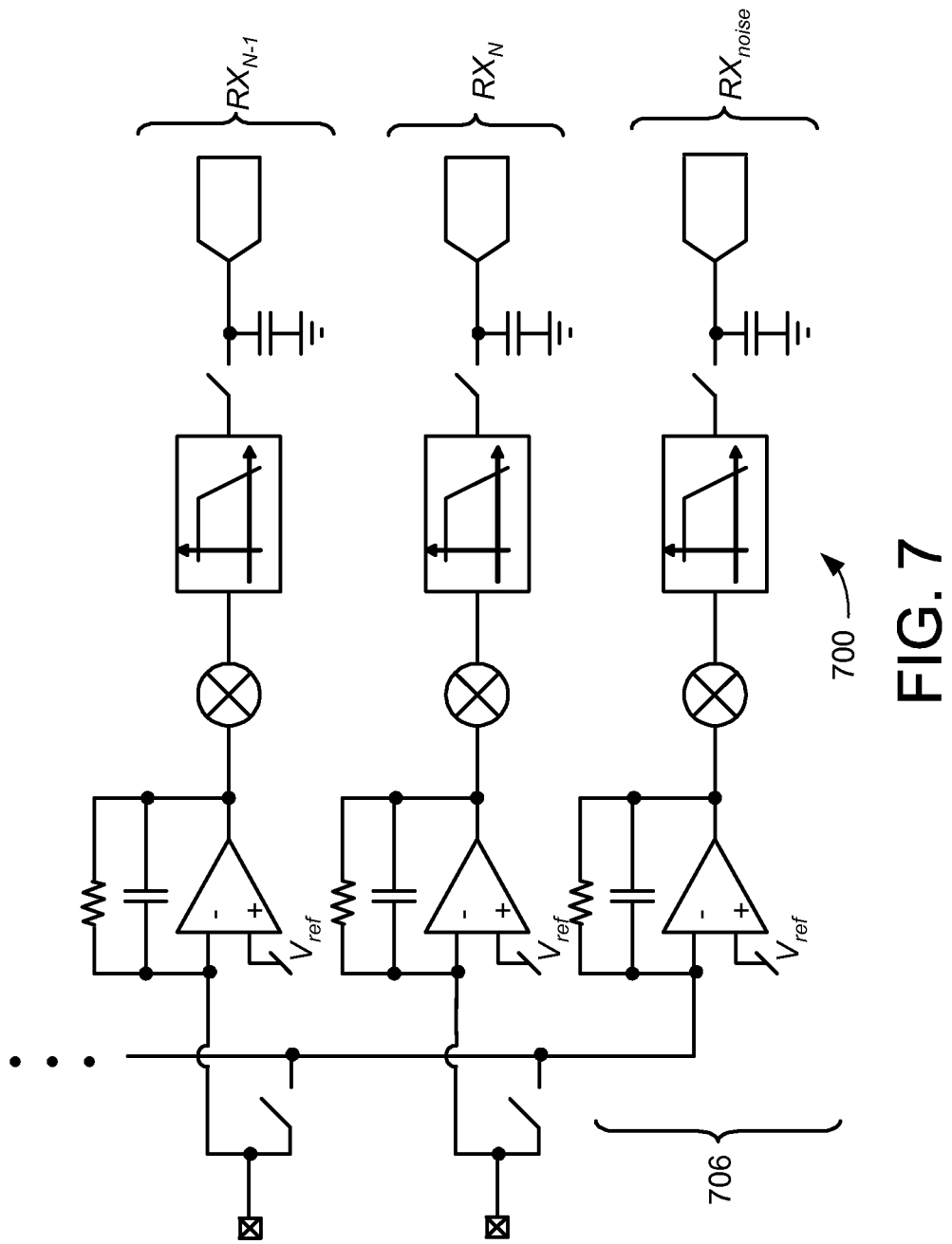

While the embodiments in FIGS. 4 and 6 use switches (e.g., switch 412) to reset the accumulating capacitors, that is only one example embodiment. Turning now to FIG. 7, an embodiment of accumulation circuitry 700 is illustrated resistors are used in place of switches to facilitate resetting of the accumulating capacitors. In this embodiment, fewer switches are required, but resetting would occur more slowly as the accumulating capacitors need to discharge through the resistors to reset.

Figure 8:
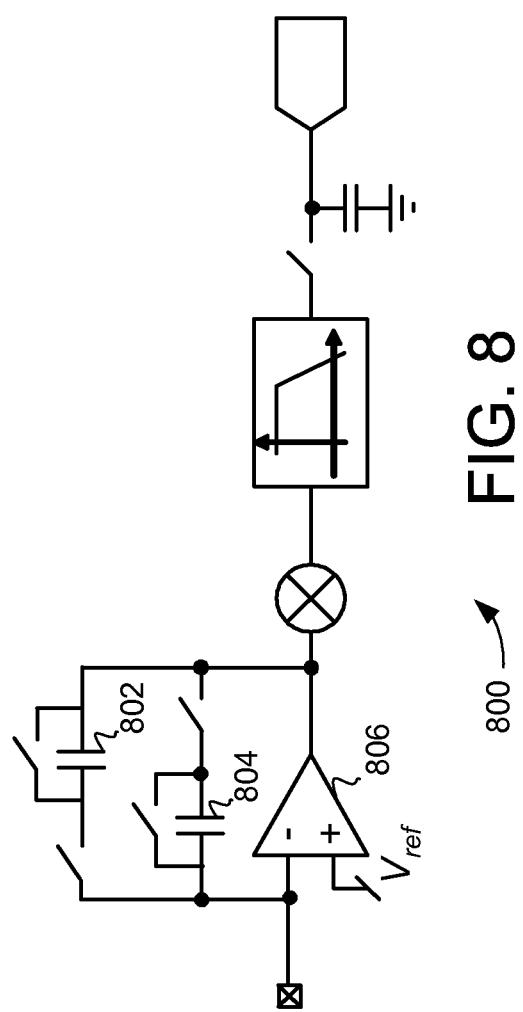

Turning now to FIG. 8, another embodiment of accumulation circuitry 800 is illustrated. In this embodiment, two accumulating capacitors 802 and 804 are driven with one amplifier 806. This allows both the first and second portions of the resulting signal to be accumulating using only one amplifier, and can thus reduce the number of elements needed in the accumulation circuitry.

Figure 9:
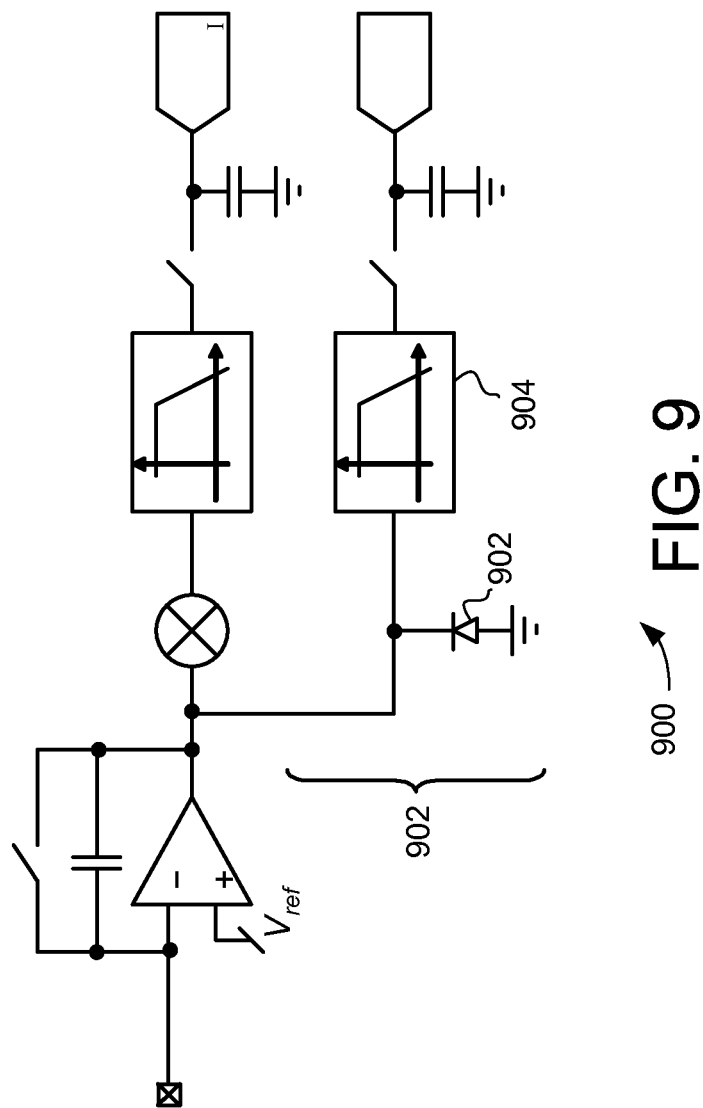

While the embodiments illustrated in FIGS. 4-8 illustrate and describe the use of capacitors to accumulate first and second portions of the resulting signals, it should be noted that other devices and techniques may be used to separately accumulate those portions of the resulting signals. Turning now to FIG. 9, another embodiment of accumulation circuitry 900 is illustrated. In this embodiment, a separate capacitor accumulating the second portion is not used. Instead, the diode 902 and filter 904 function as an envelope detection circuit that directly measures the signal in the second portion of the resulting signal. This allows the magnitude of the resulting signal during the second portion to measured/sampled from the same input circuitry that measures the first portion. Such an embodiment may determine a ratio of signal-to-noise or other suitable interference metric.

As was described above, in many embodiments input devices will include a plurality of sensor electrodes, such as additional receiver electrodes and/or additional transmitter sensor electrodes. In such embodiments one or more transmitter sensor electrodes may be capacitively coupled to one or more receiver sensor electrodes.

As one such example, the processing system may be configured to receive a second resulting signal from the second receiver sensor electrode, the second resulting signal corresponding to the transmitter signal. In such an embodiment the processing system may be configured to separately accumulate, for each cycle of the transmitter waveform, a "second" first portion and a "second" second portion of the second resulting signal to respectively produce a "second" first accumulation and a "second" second accumulation, where the "second" first portion and the "second" second portion are non-coterminous. The "second" first accumulation may be used for determining the user input to the input device and the "second" second accumulation may be used for the determining interference. Likewise, such a system may be configured to also accumulate and use a "second" third portion and "second" fourth portion. Finally, such a system many include many more such electrodes, and thus may provide for accumulation of many additional portions of different resulting signals.

The embodiments of the present invention thus provide devices and methods that facilitate improved sensor devices. Specifically, the devices and methods provide the ability to determine both user input and interference for input devices. The reliable determination of interference in input device facilitates ameliorative action, and thus facilitates improved input device performance.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for a capacitive input device, the capacitive input device comprising a transmitter sensor electrode and a receiver sensor electrode capacitively coupled to the transmitter sensor electrode, wherein the processing system comprises:
   transmitter circuitry configured to drive a transmitter signal onto the transmitter sensor electrode, the transmitter signal comprising a transmitter waveform with repeating cycles, wherein each cycle of the transmitter waveform includes a first transition;
   receiver circuitry configured to receive, from the receiver sensor electrode, a resulting signal, the resulting signal including effects corresponding to the transmitter signal and indicative of a user input in the sensing region; and
   accumulator circuitry configured to, for each cycle of the transmitter waveform:
      separately accumulate a first portion of the resulting signal using a first channel with a first capacitor and produce a first accumulation used for determining the user input, and
      accumulate a second portion of the resulting signal using a second channel and produce a second accumulation used for determining interference,
      wherein the second portion is accumulated during a reset period that is non-coterminous with the first portion, and
      wherein the first accumulation is discharged from the first capacitor during the reset period.

2. The processing system of claim 1 wherein the first portion includes effects of the first transition on the resulting signal, and wherein the second portion starts after a beginning of the first portion.

3. The processing system of claim 1 wherein the second portion starts after the effects of the first transition have substantially settled.

4. The processing system of claim 1 wherein the second portion starts a predetermined time period after the first transition.

5. The processing system of claim 1 wherein the accumulator circuitry is further configured to, for each cycle of the transmitter waveform, reset the first accumulation during the reset period following the first portion, and wherein the second portion overlaps the reset period.

6. The processing system of claim 1 wherein the accumulator circuitry is configured to, for each cycle of the transmitter waveform, accumulate the second portion of the resulting signal by:
   accumulating the second portion with a second capacitor during the reset period.

7. The processing system of claim 1, wherein each cycle of the transmitter waveform includes a second transition, and wherein the accumulator circuitry is further configured to, for each cycle of the transmitter waveform:

accumulate a third portion of the resulting signal to produce a third accumulation, wherein the third portion includes effects of the second transition on the resulting signal, and wherein the third accumulation is also used for detecting the user input.

8. The processing system of claim 7, wherein the accumulator circuitry is further configured to, for each cycle of the transmitter waveform:
accumulate a fourth portion of the resulting signal to produce a fourth accumulation, wherein the fourth portion starts after a beginning of the third portion, and wherein the fourth accumulation is also used for detecting interference.

9. An input device for capacitively sensing input objects in a sensing region, comprising:
a transmitter sensor electrode and a receiver sensor electrode, wherein the transmitter sensor electrode is capacitively coupled to the receiver sensor electrode;
a processing system configured to:
drive a transmitter signal onto the transmitter sensor electrode, the transmitter signal comprising a transmitter waveform with repeating cycles, wherein each cycle of the transmitter waveform includes a first transition;
receive a resulting signal from the receiver sensor electrode, the resulting signal including effects corresponding to the transmitter signal and indicative of a user input in the sensing region;
separately accumulate, for each cycle of the transmitter waveform, a first portion of the resulting signal using a first channel with a first capacitor to produce a first accumulation used for determining the user input to the input device; and
accumulate a second portion of the resulting signal using a second channel to produce a second accumulation used for determining interference,
wherein the second portion is accumulated during a reset period that is non-coterminous with the first portion, and
wherein the first accumulation is discharged from the first capacitor during the reset period.

10. The input device of claim 9 wherein the first portion includes effects of the first transition on the resulting signal, and wherein the second portion starts after a beginning of the first portion.

11. The input device of claim 9 wherein the processing system is further configured to, for each cycle of the transmitter waveform, reset the first accumulation during the reset period following the first portion, and wherein the second portion overlaps the reset period.

12. The input device of claim 9 wherein the processing system is configured to, for each cycle of the transmitter waveform, accumulate the second portion of the resulting signal by:
accumulating the second portion with a second capacitor during the reset period of the first capacitor.

13. The input device of claim 9, wherein each cycle of the transmitter waveform includes a second transition, and wherein the processing system is further configured to, for each cycle of the transmitter waveform:
accumulate a third portion of the resulting signal to produce a third accumulation, wherein the third portion includes effects of the second transition on the resulting signal, and wherein the third accumulation is also used for determining the user input; and
accumulate a fourth portion of the resulting signal to produce a fourth accumulation, wherein the fourth portion starts after a start of the third portion, and wherein the fourth accumulation is also used for determining interference.

14. The input device of claim 9 further comprising a second receiver sensor electrode, wherein the transmitter sensor electrode is capacitively coupled to the second receiver sensor electrode, and wherein the processing system is further configured to:
receive a second resulting signal from the second receiver sensor electrode, the second resulting signal corresponding to the transmitter signal;
separately accumulate, for each cycle of the transmitter waveform, a second first portion and a second second portion of the second resulting signal to respectively produce a second first accumulation and a second second accumulation, wherein the second first accumulation is used for determining the user input to the input device and the second second accumulation is used for the determining interference, and wherein the second first portion and the second second portion are non-coterminous.

15. The input device of claim 14 wherein the processing system comprises a circuit element configured to accumulate the second portion of the resulting signal and the second second portion of the second resulting signal.

16. The input device of claim 14 wherein the processing system comprises a circuit element configured to non-concurrently accumulate the second portion of the second resulting signal and the second second portion of the second resulting signal.

17. A method of operating a capacitive input device, the method comprising:
driving a transmitter signal onto a transmitter sensor electrode, the transmitter signal comprising a transmitter waveform with repeating cycles, wherein each cycle of the transmitter waveform includes a first transition;
receiving a resulting signal from a receiver sensor electrode, the resulting signal including effects corresponding to the transmitter signal and indicative of a user input in the sensing region;
separately accumulating, for each cycle of the transmitter waveform, a first portion of the resulting signal using a first channel with a first capacitor to produce a first accumulation;
accumulating a second portion of the resulting signal to produce a second accumulation,
wherein the second portion is accumulated during a reset period that is non-coterminous with the first portion,
wherein the first accumulation is discharged from the first capacitor during the reset period, and
wherein the first portion includes effects of the first transition on the resulting signal, and wherein the second portion starts after a beginning of the first portion;
determining the user input using the first accumulation; and
determining interference using the second accumulation of the resulting signal.

18. The method of claim 17 further comprising, for each cycle of the transmitter waveform, resetting the first accumulation during the reset period following the first portion, and wherein the second portion overlaps the reset period.

19. The method of claim 17 wherein each cycle of the transmitter waveform includes a second transition, and wherein the method further comprises:

accumulating a third portion of the resulting signal to produce a third accumulation, wherein the third portion includes effects of the second transition on the resulting signal;

wherein the determining the user input additionally uses the third accumulation;

accumulating a fourth portion of the resulting signal to produce a fourth accumulation, wherein the fourth portion starts after a start of the third portion; and wherein the determining interference additionally uses the fourth accumulation.

20. The method of claim 17 further comprising changing the transmitter signal in response to determining interference above a threshold level.

* * * * *